US006514573B2

(12) United States Patent
Hodgkin et al.

(10) Patent No.: US 6,514,573 B2
(45) **Date of Patent: *Feb. 4, 2003**

(54) METHOD FOR REDUCING CRAZING IN A PLASTICS MATERIAL

(75) Inventors: Jonathan Howard Hodgkin, Burwood (AU); Hans Jorg Griesser, The Patch (AU); Thomas Reinhold Gengenbach, Glen Waverley (AU)

(73) Assignee: Commonwealth Scientific and Industrial Research Organisation, Campbell (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,023

(22) PCT Filed: Feb. 21, 1997

(86) PCT No.: PCT/AU97/00101

§ 371 (c)(1), (2), (4) Date: Mar. 25, 1999

(87) PCT Pub. No.: WO97/31034

PCT Pub. Date: Aug. 28, 1997

(65) Prior Publication Data

US 2002/0012755 A1 Jan. 31, 2002

(30) Foreign Application Priority Data

Feb. 21, 1996 (AU) .............................................. PN8203

(51) Int. Cl.[7] ............................ C08J 7/18; B05D 3/06; H05H 1/46

(52) U.S. Cl. ....................... 427/491; 427/498; 427/490; 427/488; 427/534; 427/536

(58) Field of Search ................................ 427/488, 489, 427/490, 491, 494, 497, 503, 509, 515, 534, 535, 536, 569

(56) References Cited

U.S. PATENT DOCUMENTS

| | | | | | |
|---|---|---|---|---|---|
| 4,312,575 | A | * | 1/1982 | Peyman et al. | 427/41 |
| 5,234,723 | A | * | 8/1993 | Babacz | 427/491 |
| 5,320,875 | A | * | 6/1994 | Hu et al. | 427/493 |
| 5,326,584 | A | * | 7/1994 | Kamel et al. | 427/491 |
| 5,433,786 | A | | 7/1995 | Hu et al. | |
| 5,494,712 | A | | 2/1996 | Hu et al. | |
| 5,514,424 | A | * | 5/1996 | Morra et al. | 427/490 |
| 5,627,079 | A | * | 5/1997 | Gardella, Jr. et al. | 427/535 |
| 5,773,098 | A | * | 6/1998 | Thomas | 427/490 |

FOREIGN PATENT DOCUMENTS

| | | |
|---|---|---|
| EP | 0487 059 A3 | 5/1992 |
| EP | 0 487 059 A2 | 5/1992 |
| WO | WO 94/27745 | 12/1994 |
| WO | WO 95/22413 | 8/1995 |

OTHER PUBLICATIONS

JP60013065, Jan 23, 1985 Stanley Electric Co. Ltd., Stabilising water–repellent film on display panel etc.—argon plasma sputtering or ion bombardment followed by fluorocarbon plasma treatment.

* cited by examiner

*Primary Examiner*—Marianne Padgett
(74) *Attorney, Agent, or Firm*—Bacon & Thomas

(57) ABSTRACT

A method for reducing crazing in a plastics material characterised in that it comprises the steps of:

(1) cleaning the surface of the material; and (2) exposing the cleaned surface to plasma of a monomer vapour so as to produce a substantially non-oxidising plasma polymer coating on the surface.

14 Claims, No Drawings

METHOD FOR REDUCING CRAZING IN A PLASTICS MATERIAL

The present invention relates to a method for reducing crazing in a plastics material, in particular a transparent plastics material.

When transparent plastics materials are used for windows, roofing, signs or light fittings maintenance of their original optical clarity is important. Unfortunately, under the influence of environmental factors such as light, heat and moisture many plastics materials suffer from crazing. Crazing is a phenomenon where microvoids form in the body of the materials. These microvoids may not cause a significant deterioration in mechanical strength of the article, but they do reflect/refract light and decrease the clarity of the article. Ultimately, crazing decreases the strength of the article and can lead to failure.

As crazing is a visually obvious deterioration in the material, it gives an impression of poor quality or lack of maintenance which is particularly objectionable in applications where visual clarity is desired. Such applications include the windows of transport vehicles, roofing sheets, light fittings or signs. Many signs are made of transparent materials with the graphic material applied to the underside to be viewed through the material. Crazing in vehicle windows interferes with the vision of the occupants decreasing their enjoyment of the journey and may even pose a real safety hazard. Crazing is particularly objectionable in aircraft windows and frequently causes the replacement, at a great expense, of windows which are otherwise sound and serviceable. As a consequence of the crazing problem, the use of glass windows is being considered for aircraft despite the weight penalty that this would impose.

The cause of crazing is unknown and may be manifold. It is thought that one cause is the diffusion of small molecules such as water or surfactants into the material which decreases the attractive forces between polymer chains and allows movement of molecules under internal or external stress thus forming microvoids.

According to the present invention there is provided a method for reducing crazing in a plastics material which comprises the steps of:

(1) cleaning the surface of the material; and (2) exposing the cleaned surface to plasma of a monomer vapour so as to produce a substantially non-oxidising plasma polymer coating on the surface.

The method of the present invention may be used to reduce crazing in a wide variety of plastics materials, such as, for example, acrylics, styrenes, polycarbonates, polyesters or polyurethanes. The plastics material may be an article which is preferably in the form of a laminate or sheet. The method will have particular value when applied to transparent plastics material where visual clarity is important. Examples of transparent materials include acrylic or polycarbonate sheets as used for the windows of transport vehicles such as aircraft, boats, trains and motor vehicles, signs or for architectural uses such as in roofing, glazing sheets and light fittings.

The material may be cleaned in step (1) by any method which leaves the surface substantially free of any contamination capable of interfering with the adhesion of the plasma polymer coating. A preferred method of cleaning the surface is to subject the material to a low pressure plasma of an inert gas such as argon, neon, or nitrogen. Another preferred method of cleaning the surface involves subjecting the material to a low pressure plasma of an oxidising gas such as air or oxygen. Water vapour is also a suitable oxidising gas for this purpose. These cleaning methods may be advantageously carried out in the same apparatus which is used in step (2) of the method.

The monomer used in step (2) may be any saturated or unsaturated organic compound capable of producing a coating of a substantially non-oxidising polymer containing organic groups.

Suitable saturated monomers include siloxanes, fluorinated compounds, lower hydrocarbons, lower alcohols, lower alkylamines and mixtures thereof The term "lower" as used herein refers to monomers containing 1 to 12 carbon atoms.

Suitable unsaturated monomers include acrylic esters, methacrylic esters, vinyl esters, vinyl aromatics, unsaturated or polyunsaturated hydrocarbons and mixtures thereof. Examples of these monomers include methyl acrylate, ethyl acrylate, butyl acrylate, 2-ethylhexyl acrylate, methyl methacylate, ethyl methacrylate, n-butyl methacrylate, 2-ethylhexyl methacrylate, vinyl acetate, styrene, p-chloromethylstyrene, 2-vinylpyridine, 4-vinylpyridine, N-vinylpyrrolidone, vinyl halides of the formula $CH_2{=}CHX$ wherein X in Cl or F, vinylidene halides of the formula $CH_2{=}CX_2$ wherein X is independently Cl or F, vinyl ethers of the formula $CH_2{=}CHOR$ wherein R is alkyl, and allyl derivatives such as allyl ethers, allyl carbonates or diallyl carbonates.

Plasma polymers from some of these monomer classes typically undergo extensive oxidation on aging (Gegennbach et al, *J Polymer Sci, Part A Polymer Chemistry,* 32, 1399–1414 (1994); Gegennbach et al, *Surface Interface Analysis,* in press 1996). In those cases it is necessary to carefully adjust the plasma deposition parameters until minimal oxidation following ageing in the air is obtained. While substantial oxidation can occur in plasma polymers without affecting their structural integrity, minimal oxidation lessens the danger of adverse changes to the surface or mechanical properties of a plasma polymer as it ages. As used herein, the term "substantially non-oxidising polymer" refers to materials which show such minimal oxidation.

It has been found that for windows made from acrylic polymers such as those used in aircraft, the substantially non-oxidising polymer coating is preferably hydrophobic. Siloxanes or perfluorinated compounds are particularly suitable monomers for producing hydrophobic coatings provided that the resulting polymer contains some organic groups. Examples of such monomers include hexamethyldisiloxane, vinyltrimethoxysilane, perfluorocyclohexane and tetrafluoroethylene.

For plastics materials where the crazing is caused by exposure to hydrophobic molecules such as petroleum products, a hydrophilic coating may be more suitable in which case monomers such as alcohols or alkylamines may be used. Preferred examples of such monomers include methanol, ethanol and the various isomers of propanol or butanol.

The plasma polymer coatings produced by the method of this invention are usually highly crosslinked and hence stable. They may also be abrasion resistant.

Many of the materials to which the method of the present invention can be applied are subject to varying stresses in service and move or flex slightly as a consequence. Accordingly, there is a need to match the mechanical compliance of the coating with that of the material. The present invention achieves this by ensuring that the plasma polymer coating applied in step (2) is thin and adheres well to the material so that it moves with the material without itself cracking or crazing. It is preferred that the plasma polymer coating has a thickness of about 2 to about 500 nm, more preferably about 5 to about 50 nm.

The prior art methods produce thicker coatings which are unable to follow the movement of the material and crack and/or delaminate.

The method of the present invention may be carried out in any suitable apparatus for performing plasma polymerization such as that described in AU 654131. AU 654131 describes a process for plasma coating polymeric materials in a vapor of an amide monomer so as to provide a coating suitable for the growth of cells on biomedical implants to be administered into the human body. Preferably, low pressure plasma polymerization is employed in which the pressure is about 0.11 to 1.0 torr, preferably about 0.5 to 1.0 torr.

The present invention also provides a craze resistant article comprising a plastics material having a thin coating of a substantially non-oxidizing plasma polymer containing organic groups.

This invention is further explained and illustrated in the following non-limiting examples.

EXAMPLE 1

Coating of Acrylic Plastic Sheet

Test strips of 35 cm×3 cm were cut from a 3 mm thick acrylic sheet. Each strip was cleaned by wiping with toluene-soaked, lint-free tissues and repeated twice further with fresh tissues. The final preparation of the surface was achieved by treatment in an air plasma under the following conditions:

0.55 Torr pressure of air 225 kHz frequency

10 Watt load power 60 secs duration.

The coating was applied to the air plasma cleaned sample by exposure to a plasma in hexamethyl disiloxane vapour under the following conditions:

0.11 Torr pressure 225 kHz frequency

50 Watt load power 240 secs duration.

A strong adherent coating of plasma polymer was formed.

EXAMPLE 2

Evaluation of Effect of Coatings on Craze Resistance

Test strips prepared according to Example 1 were tested for susceptibility to crazing using a modification of the cantilever test method of Burchill, Mathys and Stacewicz (*J. Materials Science* 22, 483–487 (1987)) which is a modification of the standard test method ANSI/ASTM F484-77 "Stress crazing of acrylic plastics in contact with liquid or semi-liquid compounds". The samples were 35 cm long. A weight of 1 kg was suspended from the unsupported end of the test strip. The load was applied for 10 mins before placing the test fluid (iso-propanol) on the tensile surface which was kept wet until examination for crazing (at least a further 20 mins).

Uncoated control strips cut from the same sheet crazed within 20 mins. However, the strips prepared in Example 1 did not craze after 6 hrs when the test was halted.

EXAMPLE 3

Coating of Commercial Acrylic Sheet With N-heptylamine Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in n-heptylamine vapour under the following conditions:

0.40 Torr pressure 200 kHz frequency

10 Watt load power 180 second duration.

A coating of plasma polymer ca 120 nm thick formed.

EXAMPLE 4

Coating of Commercial Acrylic Sheet With N-heptylamine Polymer After Argon Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an argon plasma under the following conditions:

0.50 Torr pressure 200 kHz frequency

10 Watt load power 60 second duration.

The coating was applied to the plasma-cleaned sample by exposure to a plasma in n-heptylamine vapour under the following conditions:

0.40 Torr pressure 200 kHz frequency

20 Watt load power 180 second duration.

A coating of plasma polymer ca 110 nm thick formed.

EXAMPLE 5

Coating of Commercial Acrylic Sheet with N-hexane Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in n-hexane vapour under the following conditions:

0.11 Torr pressure 200 kHz frequency

20 Watt load power 120 second duration.

A coating of plasma polymer ca 140 nm thick formed.

EXAMPLE 6

Coating of Commercial Acrylic Sheet With N-hexane Polymer After Argon Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an argon plasma under the following conditions:

0.50 Torr pressure 200 kHz frequency

10 Watt load power 60 second duration.

The coating was applied to the plasma-cleaned sample by exposure to a plasma in n-hexane vapour under the following conditions:

0.40 Torr pressure 200 kHz frequency

20 Watt load power 120 second duration.

A coating of plasma polymer ca 130 nm thick formed.

EXAMPLE 7

Coating of Commercial Acrylic Sheet With Methanol Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in methanol vapour under the following conditions:

0.60 Torr pressure 200 kHz frequency

20 Watt load power 600 second duration.

A coating of plasma polymer ca 51 nm thick formed.

EXAMPLE 8

Coating of Commercial Acrylic Sheet With Perfluorodimethylcyclohexane Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in perfluorodimethylcyclohexane vapour under the following conditions:

0.2 Torr pressure 200 kHz frequency

5 Watt load power 180 second duration.

A coating of plasma polymer ca 120 nm thick formed.

EXAMPLE 9

Coating of Commercial Acrylic Sheet With Methyl Methacrylate Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in methyl methacrylate vapour under the following conditions:

0.5 Torr pressure 200 kHz frequency

10 Watt load power 60 second duration.

A coating of plasma polymer ca 210 nm thick formed.

EXAMPLE 10

Coating of Commercial Acrylic Sheet With N-butyl Methacrylate Polymer After Air Plasma Cleaning Test strips of 35 cm×3 cm were cut from 3 mm thick commercial cast acrylic sheet. Each strip was cleaned by wiping with toluene-soaked, lint-free tissues, and wiping repeated twice more with fresh tissues. Final preparation of the surface was achieved by treatment in an air plasma under the following conditions:

0.50 Torr pressure 200 kHz frequency

10 Watt load power 60 second duration.

The coating was applied to the plasma-cleaned sample by exposure to a plasma in n-butyl methacrylate vapour under the following conditions:

0.5 Torr pressure 200 kHz frequency

5 Watt load power 120 second duration.

A coating of plasma polymer ca 125 nm thick formed.

EXAMPLE 11

Evaluation of Effect of Coatings on Craze Resistance to Polar Materials

Test strips prepared according to Examples 3–10 were tested for susceptibility to crazing using a modification of the cantilever test method of Example 2. The samples were 35 cm long and a weight of 1 kg was suspended from the unsupported end of the test strip. The load was applied and the test fluid (isopropanol) applied immediately to the tensile surface which was kept wet and under observation until crazing occurred.

Although all test strips eventually crazed, all treated strips lasted at least ten times longer than uncoated control strips.

These results demonstrate that the process of the invention enhances the craze resistance of commercial acrylic sheet such as that used for glazing or signs as well as the stretched acrylic sheet used for aircraft windows.

Throughout this specification, unless the context requires otherwise, the word “comprise”, or variations such as “comprises" or "comprising", will be understood to imply the inclusion of a stated integer or group of integers but not the exclusion of any other integer or group of integers.

What is claimed is:

1. A method for reducing crazing in a material produced from acrylics or polycarbonates which is used as a transparent vehicle window, characterized in that it comprises the steps of:

(i) cleaning the surface of the material;

(ii) exposing the cleaned surface to plasma vapor of a monomer selected from the group consisting of siloxanes, saturated or unsaturated fluorinated lower hydrocarbons, saturated or unsaturated lower hydrocarbons and mixtures thereof, so as to produce a substantially non-oxidizing plasma polymer coating having a thickness of about 2 nm to about 500 nm on the surface of the material.

2. The method according to claim 1 wherein the polymer coating is produced from the monomer selected from the group consisting of hexamethyldisiloxane, vinyltrimethyloxysilane, perfluorocyclohexane and tetrafluoroethylene.

3. The method according to claim 2 wherein the monomer is hexamethyidisiloxane.

4. The method according to claim 1 wherein the plasma polymer coating has the thickness of between about 5 nm to about 50 nm.

5. The method according to claim 2 wherein the plasma polymer coating has the thickness of between about 5 nm to about 50 nm.

6. The method according to claim 3 wherein the plasma polymer coating has the thickness of between about 5 nm to about 50 nm.

7. The method according to claim 1 wherein the material is an acrylic sheet and the plasma vapor is hexamethyldisiloxane which produces the plasma polymer coating which has the thickness of about 110 nm.

8. The method according to claim 1 wherein the material is an acrylic sheet and the plasma vapouris n-hexane producing the plasma polymer coating which has the thickness of about 140 nm.

9. The method according to claim 1 wherein the material is an acrylic sheet which is cleaned by exposure to an argon plasma and wherein the plasma polymer coating is applied to the cleaned surface of the material by exposure to an n-hexane plasma.

10. The method according to claim 1 wherein the material is an acrylic sheet and the plasma vapour is perfluorodimethylcyclohexane which produces the plasma polymer coating which has the thickness of about 120 nm.

11. The method according to claim 1, wherein the material is a transparent aircraft window.

12. The method according to claim 2, wherein the material is a transparent aircraft window.

13. The method according to claim 3, wherein the material is a transparent aircraft window.

14. The method according to claim 1 wherein the cleaning step is performed by subjecting the material to a low pressure plasma gas at a pressure of 0.5 torr.

* * * * *